United States Patent [19]

Ryan

[11] Patent Number: 4,631,603
[45] Date of Patent: Dec. 23, 1986

[54] METHOD AND APPARATUS FOR PROCESSING A VIDEO SIGNAL SO AS TO PROHIBIT THE MAKING OF ACCEPTABLE VIDEO TAPE RECORDINGS THEREOF

[75] Inventor: John O. Ryan, Santa Clara, Calif.

[73] Assignee: Macrovision, San Jose, Calif.

[21] Appl. No.: 724,006

[22] Filed: Apr. 17, 1985

[51] Int. Cl.$^4$ ............................................. H04N 5/91
[52] U.S. Cl. ........................... 360/37.1; 360/33.1;
360/60; 360/15; 358/120; 358/335
[58] Field of Search ................... 360/37.1, 33.1, 60,
360/15; 358/120, 148, 319, 335

[56] References Cited

U.S. PATENT DOCUMENTS

| | | | |
|---|---|---|---|
| 3,018,324 | 1/1962 | Leyton et al. | 178/5.4 |
| 3,059,052 | 10/1962 | Smith et al. | 178/69.5 |
| 3,460,161 | 8/1969 | Waller et al. | 178/5.1 |
| 3,530,232 | 11/1970 | Reiter et al. | 178/5.1 |
| 3,963,865 | 6/1976 | Songer | 178/7.1 |
| 4,030,128 | 6/1977 | Perret | 360/33 |
| 4,086,634 | 4/1978 | Cook | 360/60 |
| 4,100,575 | 7/1978 | Morio et al. | 358/120 |
| 4,121,242 | 10/1978 | Janko | 358/4 |
| 4,163,253 | 7/1979 | Morio et al. | 358/120 |
| 4,213,149 | 7/1980 | Janko | 358/153 |
| 4,286,281 | 8/1981 | Suzuki | 358/4 |
| 4,390,898 | 6/1983 | Bond et al. | 358/119 |
| 4,439,785 | 3/1984 | Leonard | 358/120 |
| 4,467,358 | 8/1984 | Switsen | 358/153 |
| 4,488,176 | 12/1984 | Bond et al. | 358/141 |
| 4,488,183 | 12/1984 | Kinjo | 358/319 |

Primary Examiner—Alan Faber
Attorney, Agent, or Firm—C. Michael Zimmerman

[57] ABSTRACT

A video signal is modified so that a television receiver will still provide a normal color picture from the modified video signal while a videotape recording of the modified video signal produces generally unacceptable pictures. This invention relies on the fact that typical videocassette recorder automatic gain control systems cannot distinguish between the normal sync pulses (including equalizing or broad pulses) of a conventional video signal and added pseudo-sync pulses. Pseudo-sync pulses are defined here as any other pulses which extend down to a normal sync tip level and which have a duration of at least 0.5 microseconds. A plurality of such pseudo-sync pulses is added to the conventional video signal during the vertical blanking interval, and each of such pseudo-sync pulses is followed by a positive pulse of suitable amplitude and duration. As a result, the automatic gain control system in a videotape recorder will make a false measurement of video level which causes an improper recording of the video signal. The result is unacceptable picture quality during playback. This approach utilizes positive-going pulses which occur at a time not ordinarily used for black-level restoration in typical television receivers, and therefore does not give rise to black level depression in such typical television sets.

20 Claims, 4 Drawing Figures

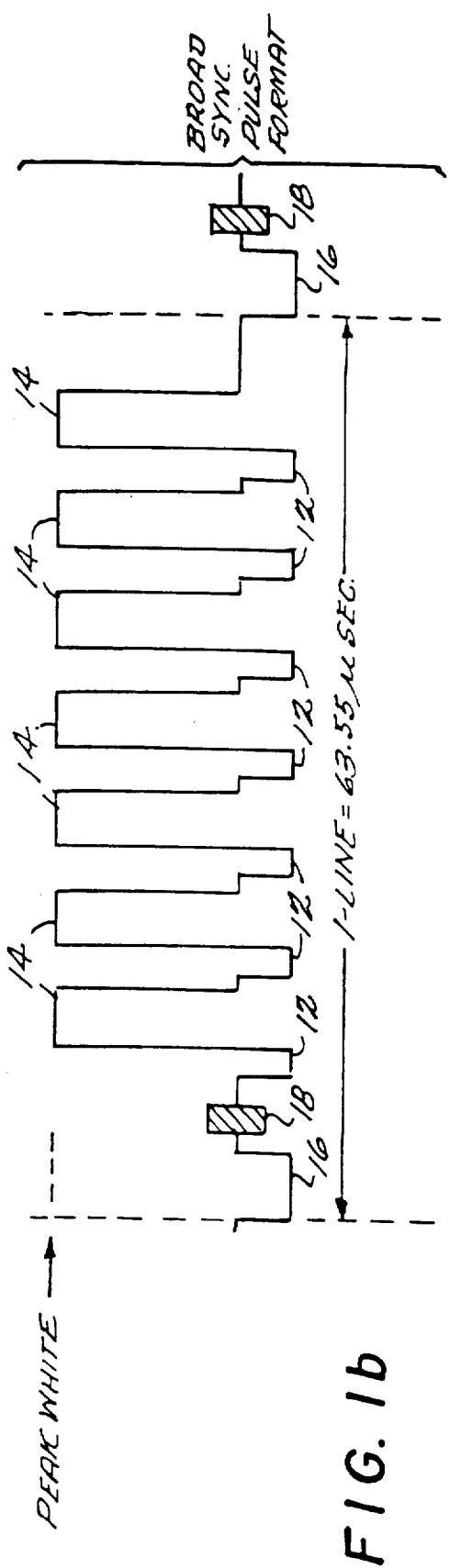
FIG. 1a
FIG. 1b

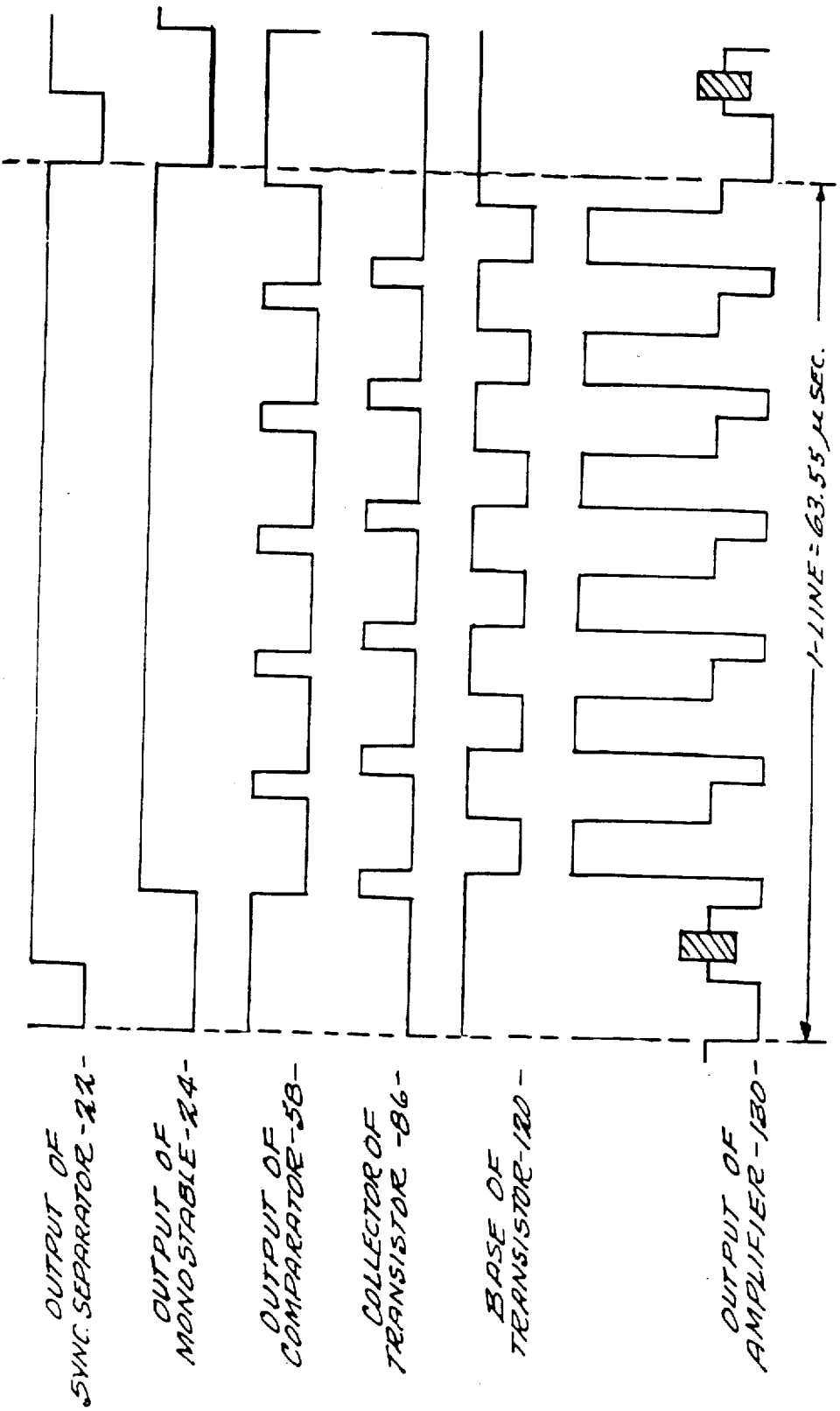

METHOD AND APPARATUS FOR PROCESSING A VIDEO SIGNAL SO AS TO PROHIBIT THE MAKING OF ACCEPTABLE VIDEO TAPE RECORDINGS THEREOF

BACKGROUND OF THE INVENTION

This invention pertains to a method and apparatus for modifying a video signal such that a television receiver may still produce a normal picture from the modified signal, while a videotape recording of the modified signal results in generally unacceptable pictures.

To protect valuable rights in video information, there exists a need for a method and apparatus for modifying a video signal so that a normal color picture may be produced by a television receiver receiving the modified video signal, but videotape recording of the modified video signal is inhibited or prevented. In a copending application by the present inventor and assigned to the assignee of the present invention, application Ser. No. 554,697, filed in the United States Patent and Trademark Office on Nov. 23, 1983, there is disclosed and described a modified video signal directed to the desirable object stated above. In other words, a television set produces a normal color picture from the modified video signal of Ser. No. 554,697, while a videocassette recording reproduces unacceptable pictures.

The invention there disclosed depends on the fact that if a pulse of suitable amplitude and duration is added to the video signal immediately following the trailing edge of a sync pulse, then an automatic gain control (AGC) system in the video-cassette recorder will behave as though the incoming video signal level is about 350% of normal level. The automatic gain control system responds by reducing the signal recording on the tape to about 30% of its normal value. Because of this reduced value, during replay, this signal will generate poor quality and unstable pictures on a normal television set.

The added pulses of the copending Ser. No. 554,697 application are in a back porch region of the video signal. Black level signal depression may be significant, however, if the pulses are added to the back porch segment on all lines of a picture frame. Therefore, the pulses are actually added only to some percentage of the back porch portions, such as every third line, to reduce significance of the black level signal depression problem. The disclosure of the Ser. No. 554,697 application is herein incorporated by reference.

The present inventor has now discovered a new invention for "confusing" or causing misoperation of the AGC system in a videocassette recorder while solving the black level depression problem. The present invention includes both method and apparatus for modifying a video signal so as to permit normal television receiver reproduction thereof while inhibiting acceptable videocassette recording of the modified video signal. In other words, when applied to the program material of a prerecorded videocassette, this invention permits the video recorder to playback clearly the cassette while not permitting the signal therefrom to be successfully recorded with another recorder.

OBJECTS AND SUMMARY OF THE INVENTION

It is therefore an object of this invention to provide a method and apparatus for modifying a video signal so that a conventional television receiver produces a normal picture from the modified signal, whereas a videotape recording made from the modified signal is rendered unacceptable.

It is a more specific object of this invention to provide such a method and apparatus in which a plurality of pseudo-sync pulse and positive pulse pairs are inserted into a color video signal in the vertical blanking region, whereby the added pulse pairs cause an automatic level control circuit in a videotape recorder to erroneously sense video signal level and produce a gain correction that results in an unacceptable videotape recording.

Briefly, in accordance with one embodiment of this invention, reliance is made on the fact that a videotape recorder's automatic gain control system does not distinguish between normal sync pulses (including equalizing and broad pulses) of a video signal and added pseudo-sync pulses. Pseudo-sync pulses are herein defined as any other pulse which extends down to the normal sync tip level and which has a duration of at least 0.5 microseconds.

Specifically, if a train of such pseudo-sync pulses is added to the video signal during the vertical blanking interval thereof, and if each such pseudo-sync pulse is followed by a positive pulse of suitable amplitude and duration, then an automatic gain control system in a given videotape recorder will make an erroneous measurement of the video signal level, and thereby cause an unacceptable recording of the video signal.

This invention avoids the potential black level signal depression problem associated with the invention disclosed in copending application Ser. No. 554,697 because these positive going pulses occur at a time not ordinarily used for black-level restoration in a television receiver.

One preferred embodiment of this invention may include its use with a pre-recorded videocassette. Playback of such a tape would permit normal viewing of the video picture, but recording of the played back video signal would be inhibited in accordance with the following disclosure.

Other objects and advantages of the present invention will appear from the following detailed description taken in conjunction with the accompanying drawings.

BRIEF DESCRIPTION OF THE DRAWINGS

FIG. 1a is an illustration of one line of a waveform of a video signal modified in accordance with the present invention, wherein the portion of the video signal shown has normal sync pulses of the equalizing pulse type;

FIG. 1b is an illustration of one line of a waveform of a video signal modified in accordance with the present invention, wherein the portion of the video signal shown has normal sync pulses of the horizontal sync pulse type;

FIG. 3 is an illustration of waveforms present at selected points in the exemplary embodiment of FIG. 2.

DETAILED DESCRIPTION OF THE PREFERRED EMBODIMENTS

Figure 2:
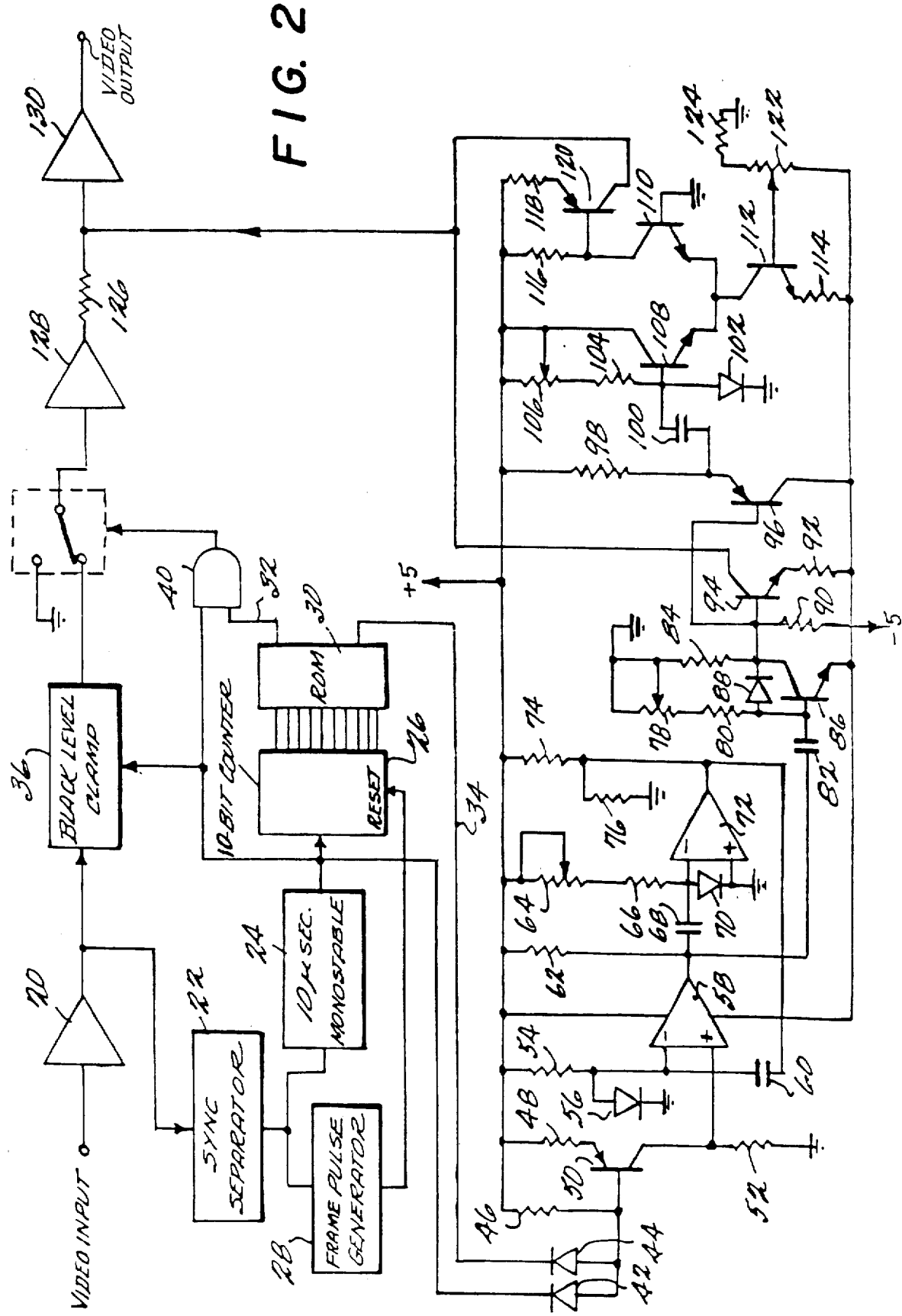
FIG. 2 is a combined block diagram and circuitry diagram of an exemplary embodiment of an apparatus in accordance with the present invention.

The waveform of FIG. 1a illustrates a conventional video signal at a portion thereof having normal equalizing pulses 10. The equalizing pulses are negative-going pulses which extend from the blanking reference signal level (marked on the vertical axis of FIG. 1a) down to the sync tip level (also marked on the vertical axis of FIG. 1a). In accordance with the present invention, a plurality of pulse pairs (e.g. adjacent pulses 12 and 14) are inserted after the equalizing pulse 10.

In accordance with nationally established standards, a single tracing line for a television receiver is approximately 63.55 microseconds in length, as shown in FIG. 1a. During such a line trace, two equalizing pulses occur. Reference characters 12 of FIG. 1a illustrate the pseudo-sync pulses of the present invention. As stated above, these are pulses which extend down to the sync tip level of the normal equalizing pulses or broad sync pulses and are at least 0.5 microseconds in duration. Further in accordance with the present invention, each pseudo-sync pulse 12 is paired with an immediately following positive pulse 14. The amplitude of the positive pulse is roughly equivalent to the amplitude of the peak white signal.

As stated earlier, the automatic gain control system of a typical videocassette recorder cannot distinguish between an equalizing pulse 10 and a pseudo-sync pulse 12, and therefore "loses" synchronization (and hence loses proper recording signal reference level) and fails to make an acceptable recording of the modified video signal.

FIG. 1b illustrates a waveform of the present invention as applied to a line in the vertical blanking region having a normal horizontal sync pulse. A conventional video signal has a single horizontal sync pulse 16 per each line followed by color burst information 18. The format of this video signal, and understanding and use of the sync pulse and color burst information are standard and well known in the art of video circuitry.

In this example seven pulse pairs of pseudo-sync pulses 12 and positive pulses 14 are inserted into the video signal after the sync pulse 16 and within the vertical blanking interval. The inclusion of seven such pairs in FIG. 1b is merely an exemplary number, and is not intended as limiting to this invention or embodiment. Pulses distributed throughout the vertical blanking interval in any manner (including random, pseudo-random or predetermined formats) is permissible in accordance with the teachings of the present invention.

For maximum effectiveness in inhibiting videotape recording, the positive pulses should have amplitudes extending to the clipping level of the medium through which the modified video signal must be transmitted. This clipping level is usually somewhere between 100% and 125% of the peak white reference level.

If a number of pulse pairs (e.g. such as 25) are used, a plurality of tracing lines during the vertical blanking interval may be modified to obtain that number of pulse pairs. Such modified lines may be contiguous or may be randomly scattered throughout the vertical blanking interval.

As an additional feature of the present invention, the vertical blanking interval itself can be artificially extended for several lines in each direction, and the pseudo-sync pulse trains may be added to these extra blanking lines. The desirability of such an extended vertical blanking interval is based on the fact that many television sets have inadequate retrace blanking circuitry. Such television sets may actually display the positive pulses during vertical retrace. To prevent this, extension of the vertical blanking intervals permits actual vertical retrace during a totally blanked interval, with the added pseudo-sync pulses coming outside of the actual vertical retrace. Since most television sets are overscanned by 5% to 10%, these pulses would still be invisible.

One of ordinary skill in the art of video circuit design will understand many different ways in which the principles of this invention may be reduced to practice. Present FIG. 2 shows an exemplary embodiment of a preferred apparatus. The general circuit blocks disclosed in FIG. 2 are well known in the art, and provided for simplicity sake.

An incoming conventional video signal is input to and buffered by a unity-gain amplifier 20. This amplifier feeds sync separator 22. The leading edges of normal sync pulses at the output of sync separator 22 trigger monostable multivibrator 24. Monostable multivibrator 24 then generates 10 microsecond negative pulses at its output in response to its triggering input. These pulses are counted by 10-bit counter 26. A frame pulse generator 28 is also fed by the sync separator 22, and in turn outputs a reset signal to counter 26 upon the occurrence of each frame. Each state of the counter 26 corresponds to a specific line (or half line) during the vertical sync interval) of such a frame. In the case of a 525 line NTSC (National Television Standard Committee) system, there will be a total of 543 different states, the extra eighteen states being due to the twice line-frequency equalizing and broad pulses.

The ten data lines from this counter feed the address inputs of a Read Only Memory (ROM) 30. ROM 30 is configured as a 1024 by 2 array. By suitable programming of this ROM, the high states of its outputs may be arranged to correspond to specific lines of the frame. Output line 32 of ROM 30 is used to cause extension of the vertical blanking interval, referred to supra. Actual operation of the present apparatus in achieving this feature will be discussed further below. Output 34 of ROM 30 controls generation of the pseudo-sync and positive pulses which are added to the conventional video signal.

The video signal input to amplifier 20 is applied to the black level clamp 36, which is driven by pulses from the monostable multivibrator 24. This black level clamp insures that the blanking level of the video signal applied to the blanking switch 38 is held to some reference level (e.g., such as 0 volts) despite variations in the average picture signal level or in amplifier offsets, or similar sources of bias. The blanking switch 38 may be comprised of basically a fast electronic switch which selects either the video signal input from the black level clamp 36 or the clamp reference voltage (here shown as 0 voltage) under control of AND gate 40.

The output of AND gate 40 goes high only during the active portions of those tracing lines for which the output 32 of ROM 30 is also high. Blanking switch 38 then selects the 0 volt (or reference level) input whenever the output of AND gate 40 is high. The combination of the black level clamp 36, AND gate 40, blanking switch 38 and the output line 32 of ROM 30 constitutes means for extending the vertical blanking interval, as referred to above. An extension of the vertical blanking interval is accomplished by removing video from those lines before and/or after normal vertical blanking during which it is desired to add the pseudo-sync pulses (and paired positive pulses) of this invention.

The remaining circuitry of FIG. 2 is concerned with generation of the pseudo-sync pulses and positive pulses, and their paired addition to the input conventional video signal.

Components 48 through 76 comprise an oscillator of a design known to one of ordinary skill in the art. In this instance, this oscillator generates a train of two microsecond positive pulses at the output of comparator 58, although other similar but different pulse durations are within the teachings of this invention. The interval between these pulses is variable over a 3 to 25 microsecond range by adjustment of the potentiometer 64. This oscillator comprised of elements 48 through 76 can run only when the cathodes of diodes 42 and 44 are both high (i.e., at +5 volts), which occurs only during the active portions of those lines of the video signal for which the output 34 of ROM 30 is high.

Components 78 through 90 form a first monostable multivibrator which, in this example, generates a positive-going pulse at the collector of transistor 86 in response to the negative-going edge of pulses from comparator 58. The duration of this pulse can be varied over a 0.7 to 3.5 microsecond range by adjustment of the potentiometer 78. Positive-going pulses at the collector of transistor 86 causes current pulses to occur in transistor 94, which subsequently generates negative-going pulses across load resistor 126. These negative-going pulses from transistor 94 are pseudo-sync pulses in accordance with the present invention.

Components 96 through 124 form a second monostable multivibrator which is triggered by the negative-going edge of the pulses at the collector of transistor 86. These pulses from the collector of transistor 86 correspond to the trailing edge of the pseudo-sync pulses. The output of this second monostable multivibrator is a pulse train of current from the collector of transistor 120 which develops the positive pulses in accordance with the present invention across load resistor 126. Hence, the positive pulses of this invention are derived from the trailing edges of the pseudo-sync pulses of this invention. Together, a pseudo-sync pulse and its trailing (or following) positive pulse constitute an exemplary pulse pair (presented in plurality) of the present invention which is added within the blanking interval of a conventional video signal after the normal sync pulse thereof.

The duration of the positive pulses from transistor 120 may be varied within a range of from 1 to 5 microseconds by adjustment of the potentiometer 106. The amplitude of these pulses may be varied between 0 to 150% of the peak white level of the input video signal by adjustment of the potentiometer 122.

The portions of the conventional video signal input which pass through blanking switch 38 are feed through amplifier 128, load resistor 126, and then combined with the pseudo-sync pulses generated by transistor 94 and the following positive pulses generated by transistor 120. This combined signal (i.e., the modified video signal in accordance with the present invention) is then output via unity-gain buffer amplifier 130 as a video signal for reception by a television receiver or attempted recording by a videotape recorder.

FIG. 3 is a timing diagram which shows selected pulse timings at various points in the exemplary circuit of FIG. 2. Reading from the top of FIG. 3, the first waveform illustrates the output of the sync separator 22. At the far left-hand portion of this waveform is shown a negative-going normal sync pulse in accordance with a conventional video signal. The next waveform down in FIG. 3 illustrates the output of monostable multivibrator 24, which is responsive to the leading edge of the negative-going normal sync pulse from sync separator 22 to generate a negative-going pulse, shown here in the exemplary embodiment as being 10 microseconds in duration.

The next waveform down in FIG. 3 shows the output of comparator 58, which constitutes the output of the oscillator described above, which is dependent upon the sensing of the normal sync pulses of a conventional video signal. The next waveform down illustrates the signal at the collector of transistor 86, which is dependent upon the output of the oscillator (i.e., the output of comparator 58), as discussed above. The output of the collector of transistor 86 constitutes the signals produced by the first monostable multivibrator, discussed above with reference to elements 78 through 90. The base of transistor 120 has its waveform illustrated next in FIG. 3, and this waveform is dependent upon the trailing edges of the output signals from the first monostable multivibrator.

With reference to FIG. 3, it may be seen that the collector output of transistor 86 is inversed by transistor 94, and the output thereof is the pseudo-sync pulses in accordance with the present invention, as discussed above. Likewise, the signal at the base of transistor 120 is output by that transistor to serve as the positive pulses in accordance with the present invention, which follow the trailing edges of the pseudo-sync pulses. The bottom waveform of FIG. 3 is an exemplary resulting video signal modified in accordance with the present invention, wherein the normal sync pulse is followed by color burst information and then a plurality of pseudo-sync pulse and positive pulse pairs.

Within the scope of the present invention, various duration, amplitude and time interval parameters may be selected for optimization in practice with particular television sets and videotape recorders. The present inventor has experimentally determined that the following criteria may be used to comprise an exemplary embodiment which is effective to achieve the objects of the present invention with a wide variety of different videotape recorders. These criteria include:

(1) the duration of each pseudo-sync pulse should be at least one microsecond;
(2) the duration of each positive pulse should be at least three microseconds;
(3) the interval between adjacent pseudo-sync pulses should be at least six microseconds;
(4) at least 25 such pulse pairs should be added during each vertical blanking interval; and
(5) the amplitude of the positive pulses should extend at least to a level corresponding to that of peak white reference signal level.

Although these five criteria may be sufficient to cause the desired effect in many (or perhaps even most) videocassette recorders, there are many videocassette recorders which respond adequately when only some of the foregoing criteria are met. Thus, this complete list is sufficient but not always necessary. The present invention encompasses any method or apparatus which embodies any one or any combination of these listed criteria, so long as there are a plurality (i.e., at least two) of pseudo-sync pulses followed by positive pulses, respectively.

Furthermore, other attributes of the present invention include combination of some of the presently disclosed features with specific features of the copending application Ser. No. 554,697. For example, an apparatus in accordance with this invention may perform any one or any combination of the following functions:

(1) add a positive-going pulse immediately following the trailing edges of some percentage of the normal synchronizing pulses (including the equalizing pulses), (these added pulses may be uniformly spaced, randomly distributed or clustered throughout the field);

(2) reduce the amplitude of the synchronizing pulses;

(3) raise the black level signal level to compensate for possible black level depression effects on some television sets;

(4) add a train of pseudo-sync pulses, each of which is immediately followed by a positive pulse; and (5) cause the pulses of the positive-going pulses and/or the train of pseudo-sync pulses and positive pulse to be turned on and off on a random, pseudo-random or regular basis.

The foregoing description is a method along with an exemplary apparatus for modifying a video signal so that a television receiver produces a normal color picture from the modified signal, whereas a videotape recording of the modified signal produces generally unacceptable results. Many different forms of the apparatus and circuits are possible for practicing the method of this invention, and the particular circuitry shown is by way of example only. All such modifications and variations which would occur to one of ordinary skill in the art are included within the true spirit and scope of the present invention, which is stated more particularly in the appended claims.

What is claimed is:

1. A method for processing a video signal so as to inhibit the making of acceptable videotape recordings therefrom while producing a normal color picture on a television receiver, wherein the video signal has a blanking interval which includes a sync pulse, said method comprising the step of adding a plurality of ordered pseudo-sync pulse and positive pulse pairs to said video signal following said sync pulse and within said blanking interval, whereby said added pulse pairs cause an automatic gain control system in a videotape recorder to sense an erroneous indication of video signal level and produce a gain correction that results in an unacceptable videotape recording.

2. A method in accordance with claim 1 wherein the amplitude of said pseudo-sync pulses is equivalent to that of said sync pulse of said video signal, and said pseudo-sync pulses each have a duration of at least 0.5 microseconds.

3. A method as in claim 1 wherein said positive pulses are added to said video signal at times within said blanking interval not used by said receiver for black-level signal restoration, and thus do not cause black level depression in such a receiver receiving the processed video signal.

4. A method in accordance with claim 1 wherein said blanking interval is the vertical blanking interval of said video signal.

5. A method in accordance with claim 4 wherein:
said pseudo-sync pulses each have a duration of at least one microsecond and are at least 25 in number for each of said blanking intervals, and adjacent pseudo-sync pulses have an interval therebetween of at least 6 microseconds; and
said positive pulses each have a duration of at least 3 microseconds and an amplitude at least equal that of the peak white level of said video signal.

6. A method in accordance with claim 5 wherein said amplitude of said positive pulses is raised to the inherent clipping level of the transmission medium for the processed video signal.

7. A method in accordance with claim 4 wherein said pulse pairs are contiguous within said vertical blanking interval.

8. A method in accordance with claim 4 wherein said pulse pairs are randomly scattered throughout said vertical blanking interval.

9. A method in accordance with claim 4 wherein said pulse pairs are scattered throughout said vertical blanking interval in a non-contiguous non-random pattern.

10. A method in accordance with claim 1 wherein said blanking interval is an inserted interval of at least 63.5 microseconds to thereby prevent display by said receiver of said positive pulses due to inadequate retrace blanking circuitry thereof.

11. A method in accordance with claim 1, further comprising the step of adding a non-paired positive-going pulse immediately after a selectable percentage of said sync pulses, selection of said percentage being one of either random, pseudo-random or predetermined.

12. A method in accordance with claim 11, further comprising the step of raising the amplitude of the black-level reference signal of said video signal to thereby compensate for black level depression effects on a receiver caused by the processed video signal.

13. A method in accordance with claim 1, further comprising the step of reducing the amplitude of said sync pulses of said video signal.

14. An apparatus for processing a conventional video signal, having a blanking interval which includes a sync pulse, so that it produces a normal color picture on a television receiver but inhibits the making of acceptable videotape recordings thereof, comprising:
input means for receiving said conventional video signal;
video signal modifying means, responsive to said input means, for adding a plurality of ordered pseudo-sync pulse and positive pulse pairs to said conventional video signal following said sync pulse and within said blanking interval, and for outputting the same as a modified video signal; and
output means, responsive to said modifying means, for outputting to said television receiver and to a videotape recorder said modified video signal, wherein said television receiver produces acceptable quality pictures from said modified video signal, but an automatic gain control system of said videotape recorder senses an erroneous video signal level due to said modified video signal and produces a gain correction that results in an unacceptable videotape recording of said modified video signal.

15. An apparatus as in claim 14, wherein said modifying means includes:
oscillator means, responsive to said conventional video signal, for outputting pulses based on said sync pulses;
pseudo-sync pulse means, responsive to said oscillator means, for adding said pseudo-sync pulses to said conventional video signal; and
positive pulse means, responsive to said pseudo-sync pulse means, for adding said positive pulses to said conventional video signal.

16. An apparatus as in claim 15, wherein said oscillator means includes:
sync separator means for outputting only said sync pulses of said conventional video signal;

first monostable means, responsive to said sync separator means, for outputting a pulse stream corresponding to said sync signals;

counter means for counting said pulse stream and outputting signals indicative thereof; and pulse generator means, responsive to said counter means output, for generating said oscillator means output pulses.

17. An apparatus as in claim 16, wherein said pulse generator means includes a programmable ROM for causing said response to said counter means output to be in one of a random, pseudo-random and predetermined pattern, depending on the programming of said ROM.

18. An apparatus as in claim 15, wherein:

said pseudo-sync pulse means includes a monostable multivibrator and transistor responsive thereto for producing and adding said pseudo-sync pulses to said conventional video signal, and means for varying duration of said pseudo-sync pulses; and said positive pulse means includes a monostable multivibrator for producing and adding said positive pulses to said conventional video signal, and separate means for varying duration and amplitude, respectively, of said positive pulses.

19. An apparatus as in claim 14, further comprising vertical blanking interval extension means for extending said blanking interval in time and for limiting said adding of said ordered pulse pairs to the extended portion of said vertical blanking interval.

20. An apparatus as in claim 14, wherein said video signal modifying means adds said pulse pairs only at times within said blanking interval which are not used by said television receiver for black-level signal restoration, thereby preventing said modified video signal from causing black level depression in pictures produced by said television receiver.

* * * * *